United States Patent
Jung et al.

(10) Patent No.: US 9,967,378 B2
(45) Date of Patent: May 8, 2018

(54) MOBILE TERMINAL

(71) Applicant: LG ELECTRONICS INC., Seoul (KR)

(72) Inventors: Minyong Jung, Seoul (KR); Youngmin Lee, Seoul (KR); Taewha Choi, Seoul (KR); Sangsoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 15/241,693

(22) Filed: Aug. 19, 2016

(65) Prior Publication Data

US 2017/0187851 A1  Jun. 29, 2017

(30) Foreign Application Priority Data

Dec. 29, 2015 (KR) .................. 10-2015-0188635
Dec. 29, 2015 (KR) .................. 10-2015-0188639

(51) Int. Cl.
*H04B 1/38* (2015.01)
*H04M 1/02* (2006.01)
(Continued)

(52) U.S. Cl.
CPC ........ *H04M 1/0262* (2013.01); *H04B 1/3883* (2013.01); *H04M 1/0249* (2013.01); *H01Q 1/243* (2013.01); *H04M 2001/0204* (2013.01)

(58) Field of Classification Search
CPC ............. H04M 1/0262; H04M 1/0249; H04M 2001/0204

(Continued)

(56) References Cited

U.S. PATENT DOCUMENTS 5,857,157 A * 1/1999 Shindo ................. H04B 1/3833
455/551
6,657,654 B2 * 12/2003 Narayanaswami ... G06F 1/1632
348/14.04

(Continued)

FOREIGN PATENT DOCUMENTS

EP  2413573 A1  2/2012
EP  2663056 A1  11/2013

*Primary Examiner* — April G Gonzales
(74) *Attorney, Agent, or Firm* — Birch, Stewart, Kolasch & Birch, LLP

(57) ABSTRACT

There is disclosed a mobile terminal including a first body having a front surface in which a display unit is disposed and one open side, a battery receiving unit formed in the first body, a second body coupled to one side of the first body, a battery coupled to the second body and inserted in the battery receiving unit, a fixing hook provided in one of the first body and the second body, a moving hook provided in the other one of the first body and the second body, corresponding to the fixing hook, and a releasing button configured to release the moving hook from the fixing hook by applying a predetermined force to the moving hook, wherein the fixing hook comprises an inclined surface in one direction and a step formed in other direction, and the moving hook comprises a step formed in one direction and an inclined surface formed in the other direction such that the mobile terminal in accordance with the present disclosure may use the case having the continuous surface from the lateral surface to the rear surface, with no battery cover. Accordingly, the exterior design of the mobile terminal may be improved.

20 Claims, 11 Drawing Sheets

(51) Int. Cl.
  *H04B 1/3883* (2015.01)
  *H01Q 1/24* (2006.01)
(58) Field of Classification Search
  USPC .................................. 455/566, 572, 575.1
  See application file for complete search history.

(56) References Cited

U.S. PATENT DOCUMENTS

| | | | | |
|---|---|---|---|---|
| 7,212,845 B2* | 5/2007 | Ikeuchi | ............... | H04M 1/0214 379/433.04 |
| 7,221,961 B1* | 5/2007 | Fukumoto | ............. | G06F 1/1616 455/41.2 |
| 7,555,312 B2* | 6/2009 | Kim | ................... | H04M 1/0237 348/14.02 |
| 7,647,079 B2* | 1/2010 | Zuo | ................... | H01M 2/1066 455/550.1 |
| 7,774,033 B2* | 8/2010 | Lee | ................... | H04M 1/0237 455/575.1 |
| 7,801,577 B2* | 9/2010 | Lee | ................... | H04M 1/0262 174/257 |
| 8,164,885 B2* | 4/2012 | Lu | ..................... | H01M 2/1055 361/679.01 |
| 8,367,930 B2* | 2/2013 | Liang | ................ | H01R 4/4809 174/50 |
| 8,750,946 B2* | 6/2014 | Jiang | ................ | H04M 1/0262 455/575.1 |
| 9,431,693 B2* | 8/2016 | Kwak | ................ | H01Q 1/243 |
| 2002/0102866 A1* | 8/2002 | Lubowicki | .......... | H04M 1/0235 439/1 |
| 2003/0029976 A1* | 2/2003 | Saitoh | ................ | B60R 11/0241 248/226.11 |
| 2003/0171133 A1* | 9/2003 | Mizuta | ............... | G06K 9/00013 455/550.1 |
| 2004/0053649 A1* | 3/2004 | Sun | .................... | H04M 1/0249 455/575.1 |
| 2006/0084481 A1* | 4/2006 | Tseng | ................ | H04M 1/0262 455/575.1 |
| 2007/0151749 A1* | 7/2007 | Lai | ........................ | G06F 1/1616 174/135 |
| 2008/0146169 A1* | 6/2008 | Kim | .................... | H04M 1/0237 455/90.3 |
| 2009/0315789 A1* | 12/2009 | Sung | ...................... | H01Q 1/243 343/702 |
| 2010/0331050 A1* | 12/2010 | Tahk | ...................... | H01Q 1/243 455/566 |
| 2011/0165916 A1* | 7/2011 | Park | ........................ | H01Q 1/06 455/566 |
| 2012/0034957 A1* | 2/2012 | Kim | ....................... | H01Q 1/084 455/572 |

* cited by examiner

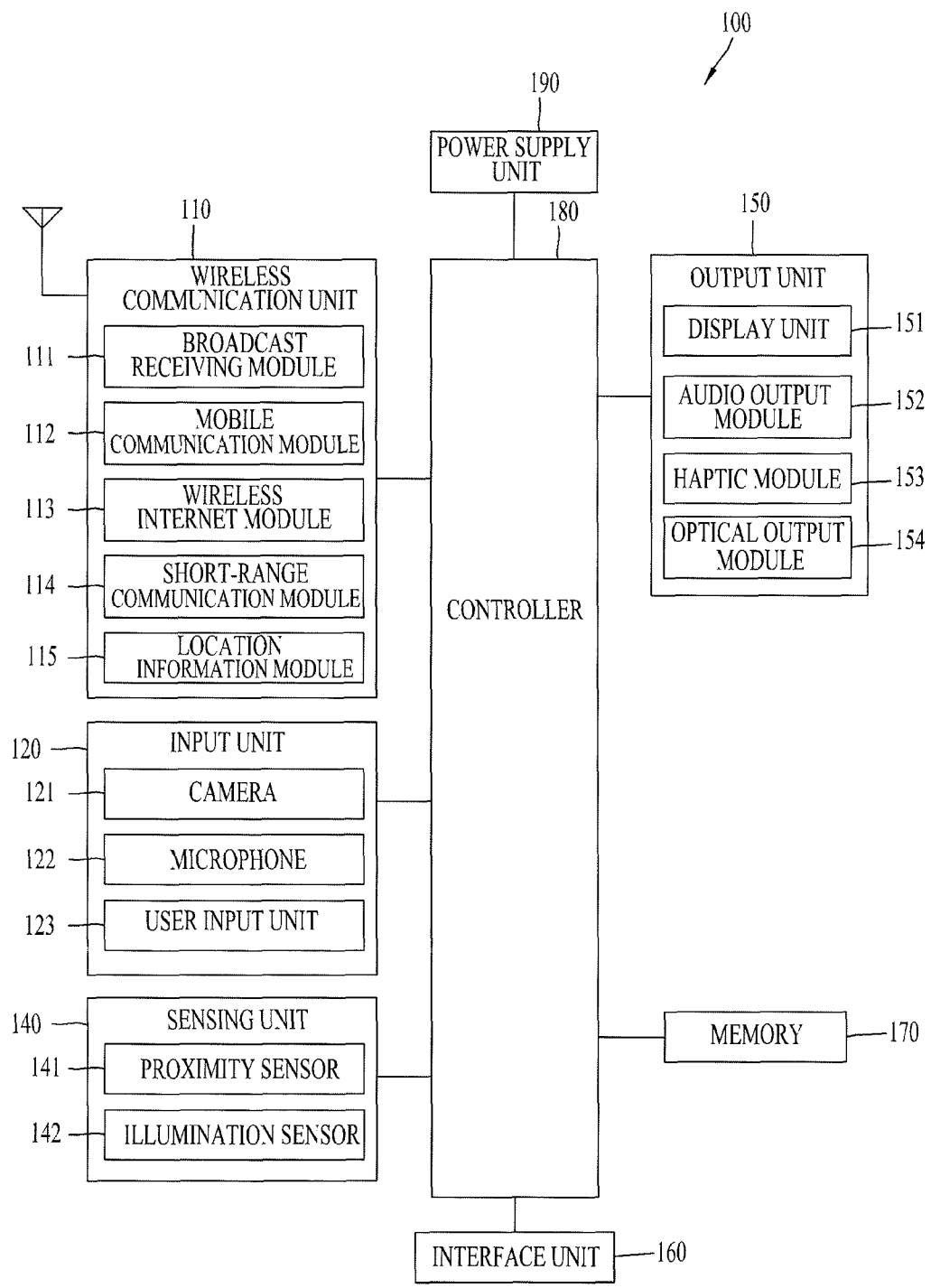

MOBILE TERMINAL

CROSS-REFERENCE TO RELATED APPLICATIONS

This application claims priority to Korean Patent Application No. 10-2015-0188635, 10-2015-0188639 filed on Dec. 29, 2015 in Korea, the entire contents of which is hereby incorporated by reference in its entirety.

BACKGROUND OF THE DISCLOSURE

Field of the Disclosure

Embodiments of the present disclosure relate to a uni-body of a mobile terminal, with no battery which is inserted longitudinally and no battery cover.

Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

As the function are comprehensively and collectively implemented to embody the mobile terminal as the multimedia player or device, a user always carries the mobile terminal and tends to regard an exterior design of the mobile terminal as more important than ever. Accordingly, users are likely to prefer mobile terminals with a clean and slim exterior design.

A mobile terminal having neither replaceable battery nor battery cover is released for a clean and slim exterior design. However, such a mobile terminal having no replaceable battery has a disadvantage that recharging has to be performed quite often.

SUMMARY OF THE DISCLOSURE

Accordingly, an object of the present invention is to address the above-noted and other problems.

An object of the present disclosure is to a mobile terminal having a uni-body, with neither battery inserted longitudinally nor battery cover.

Embodiments of the present disclosure may provide a mobile terminal including: a first body having a front surface in which a display unit is disposed and one open side; a battery receiving unit formed in the first body; a second body coupled to one side of the first body; a battery coupled to the second body and inserted in the battery receiving unit; a fixing hook provided in one of the first body and the second body; a moving hook provided in the other one of the first body and the second body, corresponding to the fixing hook; and a releasing button configured to release the moving hook from the fixing hook by applying a predetermined force to the moving hook, wherein the fixing hook comprises an inclined surface in one direction and a step formed in other direction, and the moving hook comprises a step formed in one direction and an inclined surface formed in the other direction.

The releasing button may be formed in one or more of right and left portions of the mobile terminal.

The releasing button may include a pressing portion exposed to a right-and-left side of the first body; a pushing portion inwardly extended from the pressing portion to transmit the force applied to the pressing portion to the moving hook; and a spring disposed between the pressing portion and the first body.

The moving hook may include a plate spring secured to the second body, and the releasing button may transmit a force and deform the plate spring to release the moving hook from the fixing hook.

The fixing hook may be formed in the second body, and the moving hook may include a first hinge formed in one end and coupled to the pressing portion; a hook portion formed in the other end and coupled to the fixing hook; and a second hinge formed in the other end of the hook portion and coupled to the first body.

The fixing hook may be formed in the second body, and the moving hook may include a first hinge formed in one end and coupled to the pressing portion; a hook portion formed in the other end and coupled to the fixing hook; and a second hinge formed in a middle area of the hook portion and coupled to the first body.

The mobile terminal may further include a battery fixing groove provided in the battery and having a hemispherical shape; and a battery fixing projection coupled to the second body and having a curved surface formed in one end, the curved surface corresponding to a shape of the battery fixing groove, and configured to be inserted in the battery fixing groove.

The first body may include a first metal portion provided in a rear surface and a resin portion provided in one end of the first metal portion, and the second body may include a second metal portion provided in an outer surface.

The resin portion may be arranged in parallel to an end of the display unit.

The mobile terminal may further include a main board mounted in the first body; an inner frame mounted in the second body and comprising an antenna pattern; and a connection pin configured to electrically connecting the main board and the antenna pattern to each other, wherein the main board controls signals to be transmitted and received via the antenna pattern.

The antenna pattern may include a connection pin connected to the second metal portion.

The antenna pattern may include a first antenna unit extended rightward area with respect to the first connection pin connected to the main board; and a second antenna unit extended leftward.

The resin portion may include a magnetic material.

The mobile terminal may further include a main board mounted in the first body; a sub board mounted in the second body and connected with electronic components mounted in the second body; and a connector disposed in the sub board and connected to the main board.

Embodiments of the present disclosure may also provide a mobile terminal including a first body having a front surface in which a display unit is disposed and one open side; a battery receiving unit formed in the first body; a second body coupled to one side of the first body; a battery coupled to the second body and inserted in the battery receiving unit; a fixing hook provided in one of the first body and the second body; and a moving hook provided in the other one of the first body and the second body, corresponding to the fixing hook.

The fixing hook may be projected in a hemisphere shape, and the fixing hook may include a S-shape curved surface having a projection and a groove formed in one end, and the fixing hook closely may contact with the groove of the moving hook in a state where the second body is coupled to the first body, and when the fixing hook contacts with the projection of the moving hook, the moving hook may be elastically deformed to move one end to a direction where the fixing hook is projected.

The moving hook may include a fixing groove formed in the projection in one direction with respect to the first body, and when the second body is coupled to the first body, the hooking protrusion may be inserted in the fixing groove.

One or more of the moving hook and the fixing hook may include Poly Oxy Methylene (POM).

The moving hook comprises a cam member of which a center is coupled to the first body or the second body and rotatable on the center as its shaft; a first protrusion projected from the outer circumferential surface of the cam member and configured to rotate the cam member, in close contact with the fixing hook when the second body is moved to the first body; a second protrusion projected from an outer circumferential surface of the cam member and configured to maintain the coupling state between the first body and the second body, in close contact with the fixing hook when the second body is coupled to the first body; and a third protrusion projected from the outer circumferential surface and comprising a curved surface, the mobile terminal further comprising: a hooking protrusion formed in one of the first body or the second body where the cam member is secured and configured to closely contact with the third protrusion, and the third protrusion is provided in one area near the hooking protrusion in a state where the second body is decoupled from the first body and in the other area in a state where the second body is coupled to the first body, and a distance between the first protrusion and the second protrusion is corresponding to the size of the hooking protrusion.

The second body comprises a first portion inserted in the first body and a second portion exposed outside; and a rubber exposed to a surface of the second portion and having a high frictional force.

According to the embodiments of the present disclosure, the examples of the mobile terminal in accordance with the present disclosure may use the case having the continuous surface from the lateral surface to the rear surface, with no battery cover. Accordingly, the exterior design of the mobile terminal may be improved.

If using the metal case, the non-conductive material has to be partially used for the arrangement of the antenna. However, the body of the mobile terminal is divided into the two bodies and the battery is replaceable. Accordingly, the battery use time may be solved.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 1A is a block diagram of a mobile terminal in accordance with the present disclosure.

DESCRIPTION OF SPECIFIC EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Exemplary embodiments relevant to a control method which is able to be embodied in the mobile terminal configured of such components will be described, with reference to the companying drawings. It is obvious to those skilled in the related art that the embodiments of the present disclosure may be realized into specific types in a range beyond teachings and essential technical features of the present disclosure.

Figure 1B:
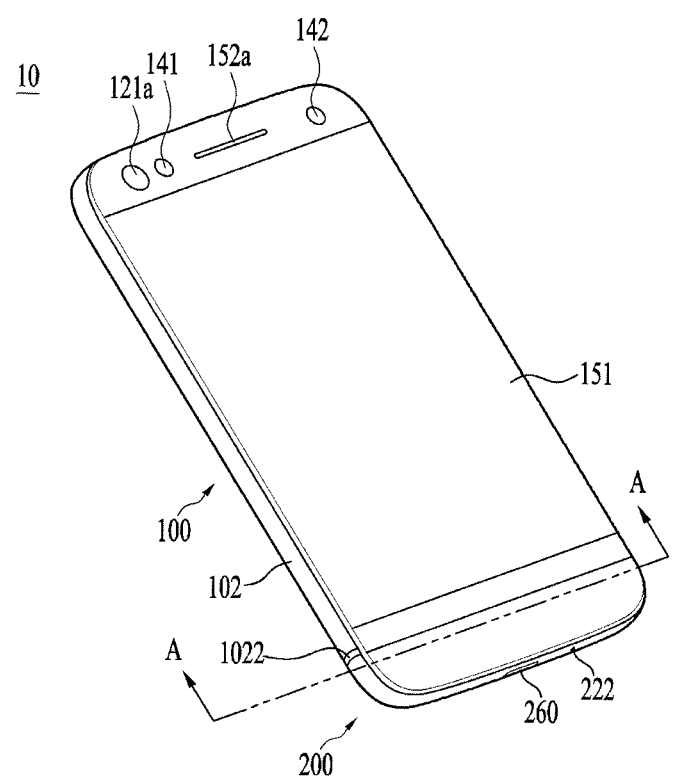
FIGS. 1B and 1C are conceptual views of one example of the mobile terminal, viewed from different directions.
Figure 1C:
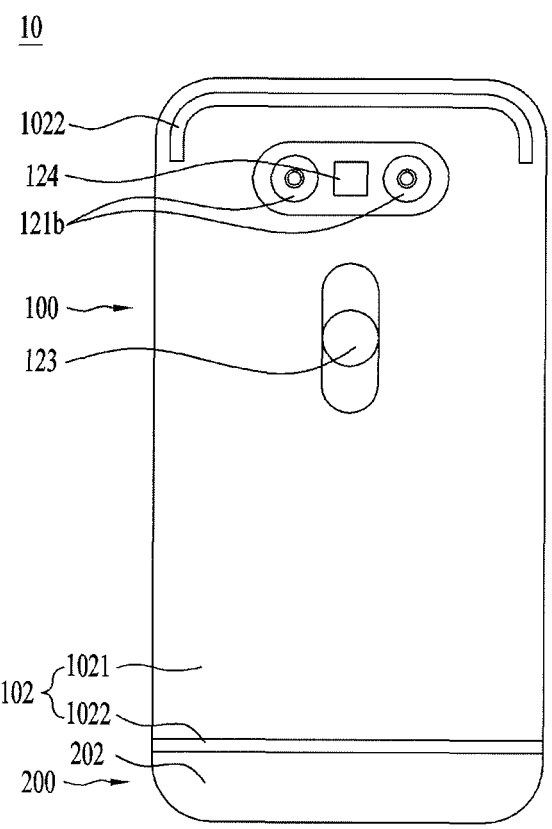

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 10 is shown having components such as a wireless communication unit 110, an input unit 120, a sensing unit 140, an output unit 150, an interface unit 260, a memory 170, a controller 180, and a power supply unit 190. It is understood that implementing all of the illustrated components is not a requirement, and that greater or fewer components may alternatively be implemented.

Referring now to FIG. 1A, the mobile terminal 10 is shown having wireless communication unit 110 configured with several commonly implemented components. For instance, the wireless communication unit 110 typically includes one or more components which permit wireless communication between the mobile terminal 10 and a wireless communication system or network within which the mobile terminal is located.

The wireless communication unit 110 typically includes one or more modules which permit communications such as wireless communications between the mobile terminal 10 and a wireless communication system, communications between the mobile terminal 10 and another mobile terminal, communications between the mobile terminal 10 and an external server. Further, the wireless communication unit 110 typically includes one or more modules which connect the mobile terminal 10 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 10 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 10 and a user, as well as function as the user input unit 123 which provides an input interface between the mobile terminal 10 and the user.

The interface unit 260 serves as an interface with various types of external devices that can be coupled to the mobile terminal 10. The interface unit 260, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 10 may perform assorted control functions associated with a connected external device, in response to the external device being connected to the interface unit 260.

The memory 170 is typically implemented to store data to support various functions or features of the mobile terminal 10. For instance, the memory 170 may be configured to store application programs executed in the mobile terminal 10, data or instructions for operations of the mobile terminal 10, and the like. Some of these application programs may be downloaded from an external server via wireless communication. Other application programs may be installed within the mobile terminal 10 at time of manufacturing or shipping, which is typically the case for basic functions of the mobile terminal 10 (for example, receiving a call, placing a call, receiving a message, sending a message, and the like). It is common for application programs to be stored in the memory 170, installed in the mobile terminal 10, and executed by the controller 180 to perform an operation (or function) for the mobile terminal 10.

The controller 180 typically functions to control overall operation of the mobile terminal 10, in addition to the operations associated with the application programs.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 10. The power supply unit 190 may include a battery, and the battery may be configured to be embedded in the terminal body, or configured to be detachable from the terminal body.

One or more of the components may be collectively operated to operate and control the mobile terminal in accordance with embodiments disclosed herewith, or to embody a control method of the mobile terminal. The operation and control of the mobile terminal or the control method of the mobile terminal may be embodied on the mobile terminal by executing or implementing one or more application programs which are stored in the memory 170.

Referring to FIGS. 1b and 1c, the mobile terminal illustrated in the drawings includes a bar type terminal body. The terminal body may be understood as a uni-body configured with one or more parts.

The mobile terminal 100 includes a case defining an exterior appearance (for example, a frame, a housing, a cover and the like). The case has a front surface with a display unit disposed thereon and covers lateral sides and a rear side of the mobile terminal, thereby realizing a uni-body case.

Such a uni-body case may provide a continuous exterior appearance only to provide a clean exterior design. In addition, a rear cover to be coupled to a rear surface of a first case 102 is omitted such that the overall thickness of the mobile terminal may be reduced.

A mobile terminal having a rear case made of metal to improve an exterior design becomes popular recently. A case using metal to cover even a rear surface of a mobile terminal is released as well as a case having metal to cover only a lateral surface.

Such the rear case using metal is likely to have a disadvantage of degrading performance of an antenna implemented by an electromagnetic wave or generating noise in the antenna. To solve the disadvantage, a resin portion 1022 partially made of a non-conductive material as shown in FIG. 1c is formed in a case using metal to allow an antenna signal to pass through the non-conductive material 1022.

Considering a design aspect of the mobile terminal and an antenna performance aspect, the non-conductive material portion may be provided in a lower area as shown in FIG. 1c. When the non-conductive material portion accords with a lower end of the display unit, the front side of the mobile terminal is divided by the display unit anyhow. The appearance having unity with the front surface may be provided accordingly.

For the exterior design with unity, a metal portion 1021 is formed first and a resin portion 1022 is formed by double-injection molding synthetic resin after that, thereby providing a first case 102 integrally formed with the resin portion 1022 partially exposed outside.

In the mobile terminal 10 may be disposed a display unit 151, first and second audio output units 152a and 152b, a proximity sensor 141, an illumination sensor 142, a light emitting unit 154, first and second cameras 121a and 121b, first and second manipulation units 123a and 123b, a microphone 222, an interface unit 260 and the like.

FIGS. 1B and 1C depict certain components as arranged on the mobile terminal.

It is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 is generally configured to output information processed in the mobile terminal 10. For example, the display unit 151 may display execution screen information of an application program executing at the mobile terminal 10 or user interface (UI) and graphic user interface (GUI) information in response to the execution screen information.

The display unit 151 outputs information processed in the mobile terminal 10. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 10.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 10. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 10. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 10 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 10, but other locations are possible. If desired, multiple microphones may be implemented, with such an arrangement permitting the receiving of stereo sounds.

The interface unit 260 may serve as a path allowing the mobile terminal 10 to interface with external devices. For example, the interface unit 260 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 10. The interface unit 260 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 10 may include a battery 191, which is mounted in the terminal body or detachably coupled to an outside of the terminal body.

The battery 191 may receive power via a power source cable connected to the interface unit 260. Also, the battery 191 can be recharged in a wireless manner using a wireless charger. Wireless charging may be implemented by magnetic induction or electromagnetic resonance.

Such the uni-body type case cannot be decoupled such that a battery cannot be replaceable. In the examples of the mobile terminal in accordance with present disclosure may be provided a uni-body allowing a battery to be replaced.

For that, an area in contact with the resin portion 1022 and the metal portion 204 is divided into an upper part and a lower part as two bodies.

Figure 2:
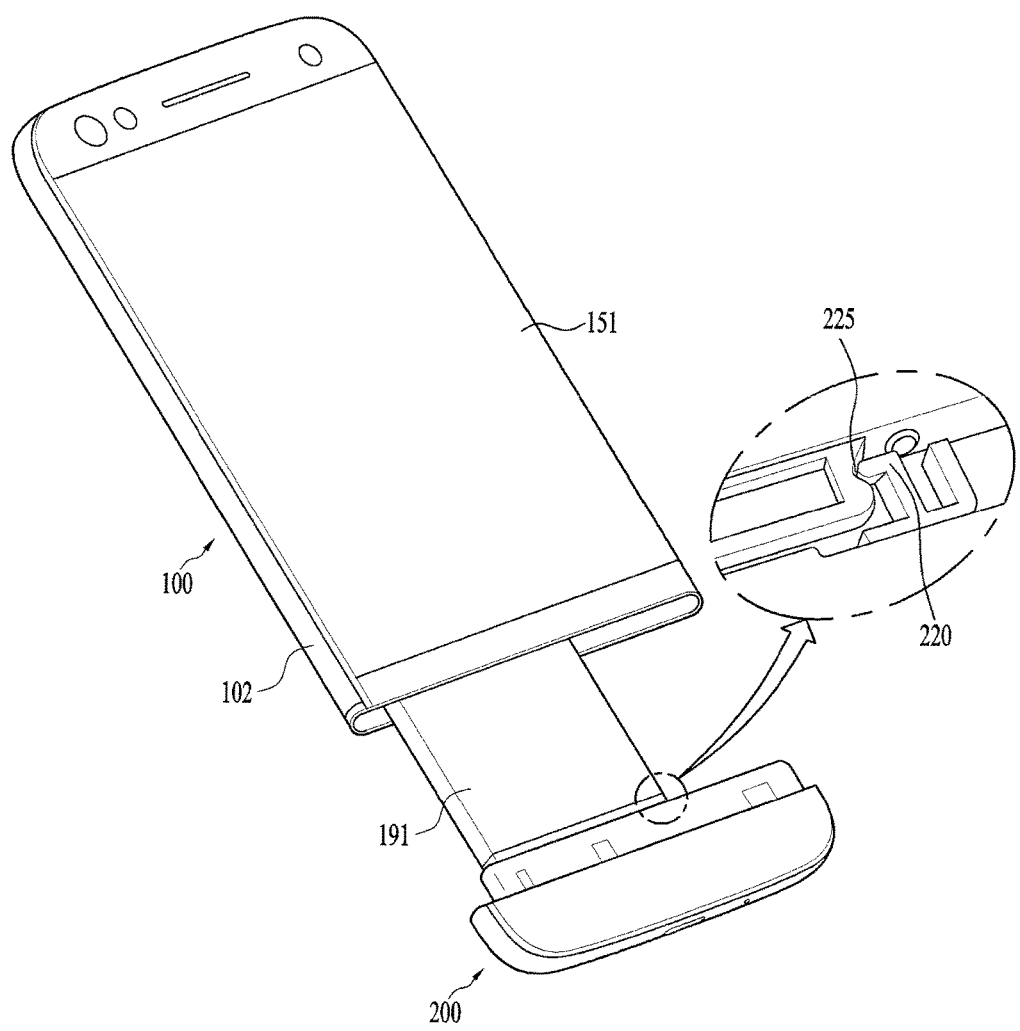
FIG. 2 is a diagram illustrating a first body and a second body of the mobile terminal which gets decoupled from each other.
Figure 3:
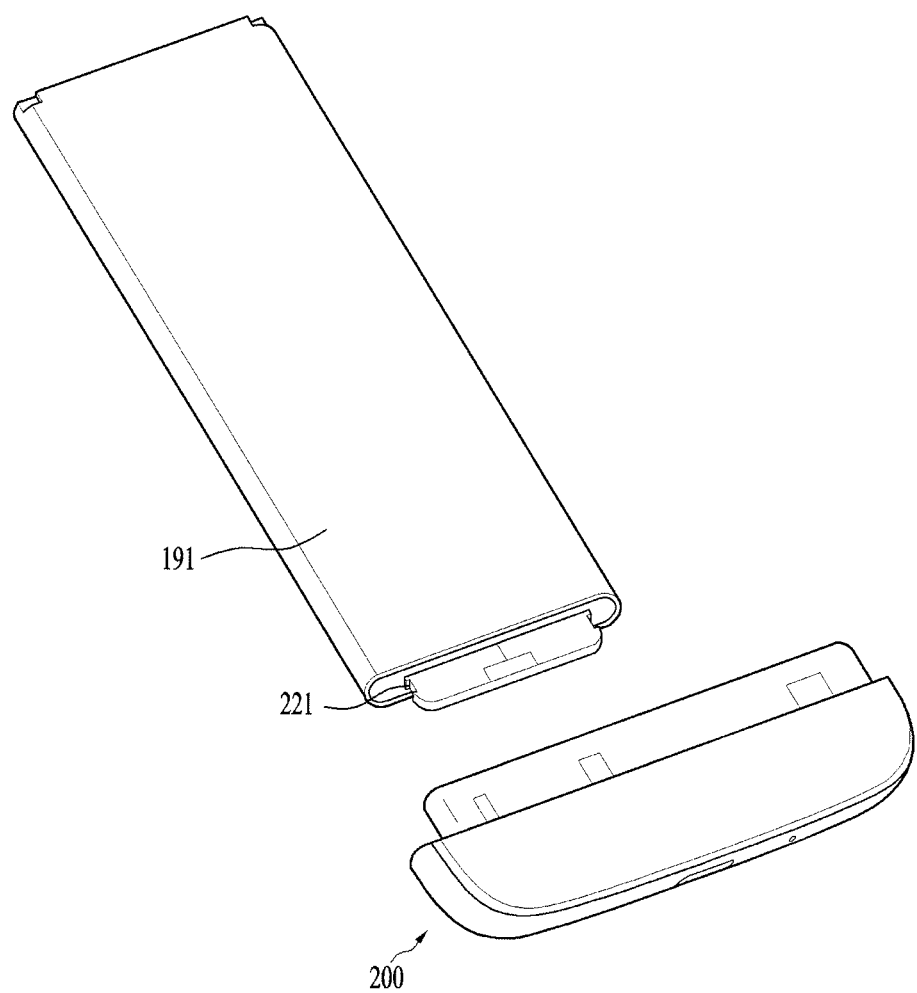
FIG. 3 is a diagram illustrating the second body and a battery which are decoupled from each other.

FIG. 2 is a diagram illustrating a first body 100 and a second body 200 of the mobile terminal 10 which are decoupled from each other. FIG. 3 is a diagram illustrating a battery decoupled from the second body 200.

The illustrated example of the mobile terminal 10 is divided into an upper part and a lower part with respect to a lower end of the display unit 151, thereby being configured of the first body 100 having the display unit 151 and the second body 200 coupled to the first body 100. As one example, the second body 200 is arranged under the display unit 151. As an alternative example, the second body 200 may be arranged on a top of the display unit 151.

One side of the first body 100 is open and the other side is closed. A battery receiving unit for having the battery 191 inserted therein is exposed through the open side of the first body 100. The first body 100 includes a case 102 having right and left surfaces and a rear surface integrally formed as one body. The uni-body case 102 having the lateral surfaces and the rear surface form a continuous surface has an advantage of providing a cleaner exterior design.

The second body 200 is coupled to the open side of the first body 100, thereby forming a bar type mobile terminal 10 together with the first body 100. A front surface of the mobile terminal 10 is corresponding to a surface under the display unit 151 and a rear surface of the mobile terminal 100 is corresponding to a surface under the resin portion 1022 mentioned before.

Even if the uni-body case made of metal is provided, there may be a boundary with other components such as the display unit 151. If the resin portion 1022 is provided, there may be a boundary between the resin portion 1022 and the metal portion 1021. Accordingly, the boundary between the first body 100 and the second body 200 is located to accord with the boundary between the resin portion 1022 and the metal portion 1021 to avoid additional boundaries.

When a battery cover provided in the rear surface is decoupled from the conventional mobile terminal 10, the battery 191 is insertedly loaded in a direction to the rear surface and replaces the old one. However, in the example of the mobile terminal 10 shown in FIG. 3, the battery 191 is fixed to the second body 200 and the battery 191 is inserted in the battery receiving unit of the first body 100.

A coupling portion of the second body 200 is partially inserted in the first body 100 not to be exposed outside. As the coupling portion of the second body 200 gets longer, the coupling state between the first body 100 and the second body 200 may be kept more stably.

A fixing projection 220 and a fixing groove 225 may be formed to fix the battery 191 to the second body 200. As shown in FIG. 2, the fixing projection 220 is fixed to the second body 200 and the fixing projection 220 is insertedly secured to the battery fixing groove 225 formed in the battery 191. An end of the fixing projection is hemispheric and the fixing groove 225 is also hemispheric. When an external force is applied, the fixing projection 220 is pushed to be secured to or separated from the fixing groove 225.

When a certain force is applied to the fixing projection 220, the fixing projection 220 is pushed and returns to an original position. The fixing projection 220 may be made of a material with a predetermined elasticity. For example, the fixing projection 220 made of synthetic resin is partially deformed to be insertedly secured to the fixing projection 225 and separated therefrom. The fixing projection 220 is repeatedly deformed by the external force to exchange the batteries. The fixing projection 220 may have an auxiliary fixing structure configured to facilitate the stable securing process to the second body 200. In other words, an L-shaped coupling structure as well as the projection secured to the fixing groove 225 may be provided only to form an F-shaped structure shown in FIG. 2.

Figure 4:
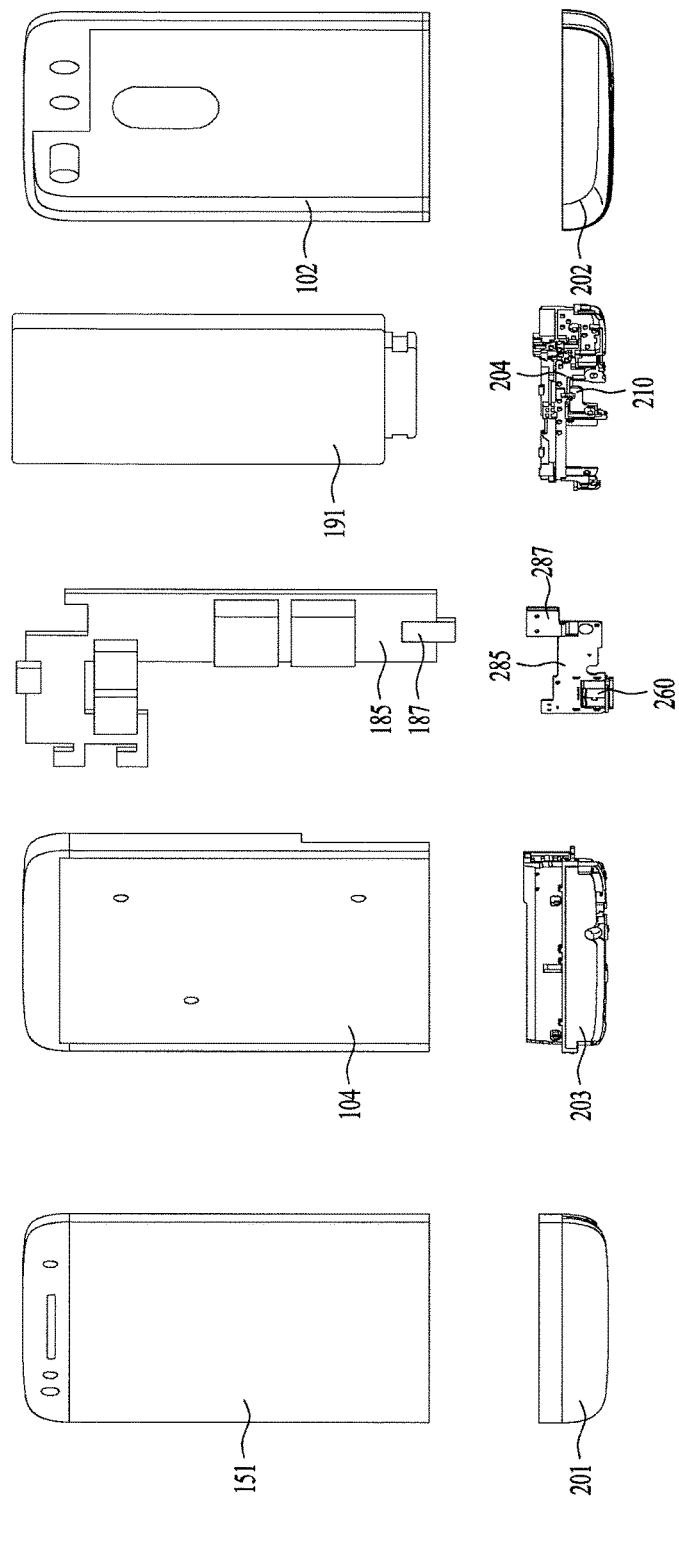
FIG. 4 is an exploded perspective diagram of the mobile terminal in accordance with the present disclosure.

FIG. 4 is an exploded perspective diagram of the mobile terminal 10 in accordance with the present disclosure. Referring to FIG. 4, the first body 100 includes the display unit 151, a middle frame 104 supporting a rear surface of the display unit 151, a main board 185 mounted in a back surface of the middle frame 104 and a first case 102 coupled to a rear surface of the middle frame 104 and configured to serve as the rear surface and the lateral surface of the mobile terminal 10 while covering the main board 185 and the middle frame 104.

When the case includes a metal material, the resin portion 1022 is formed by injection-molding synthetic resin is injection-molded in the first case 102 and the resin portion 1022 is integrally formed with the metal portion 1022 to facilitate the coupling process with other materials and the mounting process of the diverse components. Even the middle frame 104 may be made of a metal plate for the rigidity and to form a ground of the antenna. The case may include synthetic resin partially formed for the coupling process with the other components.

The display unit 151 is mounted in the front surface of the middle frame 104. The camera 121, the audio output unit 152a, the proximity sensor and the like may be arranged beyond the display unit 151. A window glass 151a coupled to the front surface of the first body 100 may be further provided and the window glass 151a may cover the camera 121 and the proximity sensor 141 as well as the display unit 151. As an alternative example, the window glass 151a may cover all area of the front surface of the first body 100 and the front case may be omitted.

The main board 185 and diverse components are mounted in the rear surface of the middle frame 104. The main board 185 may be configured in a ⌐-shape for the space receiving unit in which the battery 191 is mounted, as shown in FIG. 4. A connection pin configured to connect with the battery 191 may be provided in the main board 185 located adjacent to the battery receiving unit. Once inserted in the battery receiving unit, the battery 191 may connect with the main board 185.

The first case 102 may be configured with the metal portion 1021 and the resin portion 1022. The resin portion 1022 shown in FIG. 1c may be partially exposed outside. The color of the resin injection-molded in the resin portion 1022 is similar to the color of the metal portion 1021, to give a continuous unity to the case 102. Holes may be formed in the rear surface of the first case 102. The back side button 123 and the camera 121b are disposed in the holes, respectively.

The second body 200 may be coupled to one side of the first body 100. The case 102 may be coupled to the front surface from the rear surface of the first body 100, like the first case 102. In this instance, for the uniformity with the first case 102 of the first body 100, a second case 202 provided as a rear surface of the second body 200 may be designed to cover a lateral surface and one surface of the second body 200 and the first case 201 functioned as a front case may be designed to cover only the front surface of the second body 200. For the uniformity in an aspect of material, metal may be used in the third case 203 provided as the front surface and in the second case 202 provided as the rear surface of the second body 200. The metal may be equal to the metal used in the metal portion 1021 of the third case 102.

Inner frames 203 and 204 may be further provided in the second case 202 and the third case 201, and the components mounted in the second body 200 may be disposed in the inner frames 203 and 204. The inner frames 203 and 204 may be formed by injecting synthetic resin. A sub board 285 implemented to control the electronic components mounted in the second body 200 may be mounted between the inner frames 203 and 204. The sub board 285 is connected to the main board 185 via connectors 187 and 287. The interface unit 260, the microphone 222 and the fixing projection 220 for fixing the battery 191 may be disposed in the second body 200.

An antenna pattern may be mounted in the second body 200. When the inner frame 204 is injection-molded, the antenna pattern 210 is put in a mold and the antenna pattern 210 is integrally formed with the inner frame 204 as one body. The antenna pattern 210 may be connected to the main board 185 and serve as an antenna radiator implemented to radiate a signal. As an alternative example, the antenna pattern 210 may be connected to the second case 202 made of metal and the second case 202 may also serve as an antenna radiator.

The second case 202 of the second body 200 is partitioned off from the metal portion 1021 of the first body 100 by the resin portion 1022, such that it may be used as an antenna radiator. The length of the antenna pattern 210 formed in the inner frame 204 is adjusted to tune the frequency.

The first body 100 and the second body 200 are coupled to each other, using hooks 106 and 206. One of the hooks 106 and 206 is fixed and the other one is deformable. The pair of the hooks 106 and 206 may be secured to or separated from each other. The former one is referred to as a fixing hook 106 and the latter one is referred to as a moving hook 206.

Figure 5:
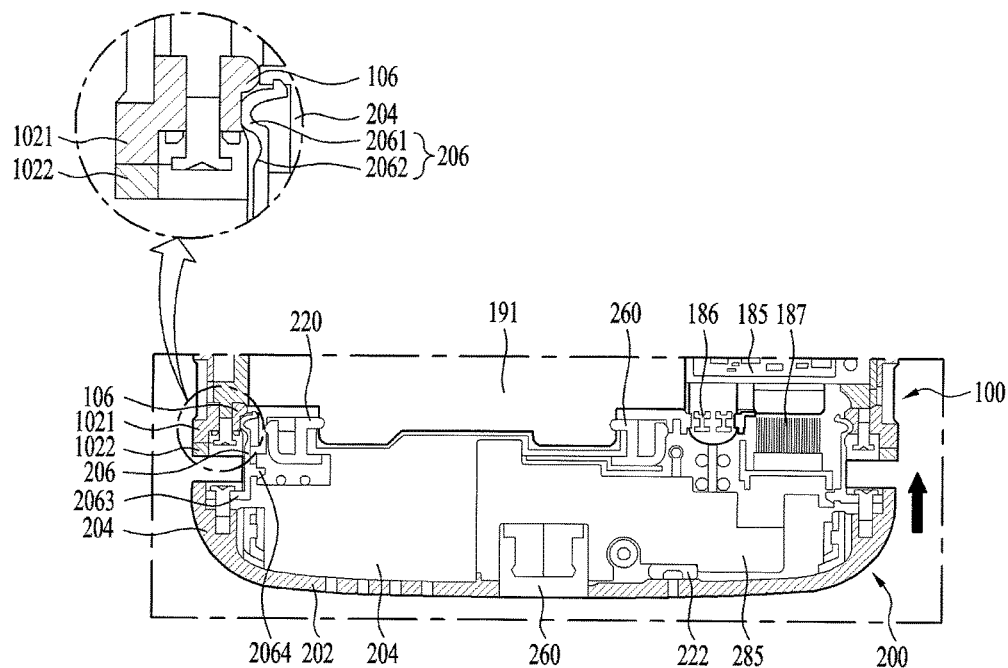
FIGS. 5 and 6 are sectional diagrams illustrating one example of a moving hook and on example of a securing hook which are provided in the mobile terminal in accordance with the present disclosure.
Figure 6:
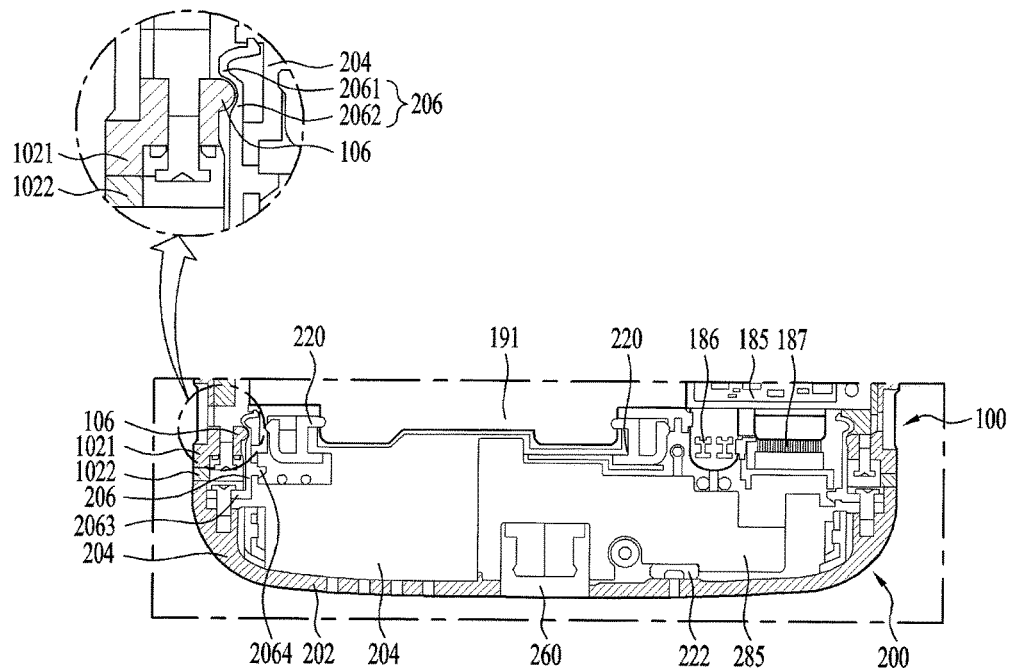

FIGS. 5 and 6 are sectional diagrams illustrating examples of the moving hook 206 and the fixing hook 106 provided in the mobile terminal 10 in accordance with the present disclosure. FIG. 5 shows a state before the first body 100 and the second body 200 are coupled to each other and FIG. 6 shows a state in which the first body 100 and the second body 200 are coupled to each other by securing the moving hook 206 secured to the fixing hook 106.

The example of the mobile terminal 10 has the fixing hook 106 formed in the first body and the moving hook 206 formed in the second body 200. The positions of the hooks 206 and 106 may be changed.

The fixing hook 106 is formed by a partially projected portion of the first body 100. In the drawings, a predetermined portion of the metal portion is projected. As an alternative example, the resin portion 1022 may be partially projected. The fixing hook 106 formed in the metal portion has an advantage of high rigidity.

The moving hook 206 secured to the second body 200 is fabricated using metal or synthetic resin. Metal or synthetic resin is deformable in a preset range, when fabricated as a thin moving hook. A hemisphere-shaped groove is formed in one end of the moving hook, corresponding to the shape of the fixing hook 106 and a projection is projected toward the first body 100 from the hemisphere shape. One side and the other opposite side of the projection have inclined surfaces, respectively. The fixing hook 106 and the moving hook 206 have inclined surfaces, respectively, and the projection and the groove of the moving hook 206 form a continuous curved surface.

One surface in contact with the fixing hook 106 has a continuous curved surface in the moving hook 206. When the user applies a force in a direction where the first body 100 is coupled to the second body 200 or in another direction where the first body 100 is decoupled from the second body 200, the moving hook 206 is moving along the curved surface to facilitate the decoupling process.

As shown in FIGS. 5 and 6, the other end 1063 of the moving hook 206 is secured to the second body 200 by a screw 230. Accordingly, the secured process with the second body 200 may not be changed even when an external force is repeatedly applied to the moving hook 206. The moving hook 206 shown in FIGS. 5 and 6 may further include a fixed end 2064 extended in the reverse direction of the other end 2063 fixed to the screw 230.

Figure 7:
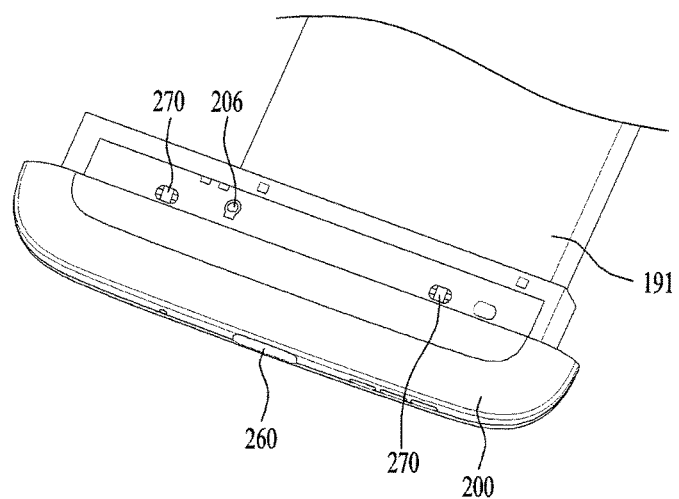
FIG. 7 is a diagram illustrating the second body and the battery which are provided in the mobile terminal.

In the illustrated example of FIG. 7, the moving hook 206 and the fixing hook 106 may be additionally provided toward the front surface or the rear surface as well as toward the lateral surfaces. The fixing hook 106 is formed in the first body 100, corresponding to the moving hook 206.

One or more of the moving and fixing hooks 206 and 106 may include Poly Oxy Methylene (POM). Poly Oxy Methylene is a polymer of formaldehyde which has a high tensile strength, a good fatigue resistance, a high hygroscopic property and a good weather resistance, thereby maintaining the shape even after repeated contact. The durability of the moving and fixing hooks 206 and 106 may be enhanced.

A material with a large frictional force may be further provided in the area where the first body and the second body 200 are coupled to each other so as to prevent them separating from each other easily. A rubber 270 shown in FIG. 7 may be further provided and the rubber 270 includes rubber and a material having a large frictional force, for example, silicon. The rubber 270 is more projected than the surface of the second body 200, to be forcedly secured to the first body 100 so as to prevent the first body 100 and the second body 200 from separating from each other.

A magnet (not shown) may be provided in the resin portion 1022 to improve the coupling force between the first body 100 and the second body 200. The magnet may be coupled to the second case 202 or the third case 201 which has the metal material of the second body 200 by a magnetic force.

When taking the second body 200 near the first body 200 to couple them to each other, the first body 100 and the second body 200 are automatically coupled to each other by the magnetic force possessed by the magnet and the coupling process may be performed more easily and smoothly.

The magnet is disposed in the mold to be integrally formed with the resin portion 1022 as one body, when injection-molding the resin portion 1022.

Figure 8:
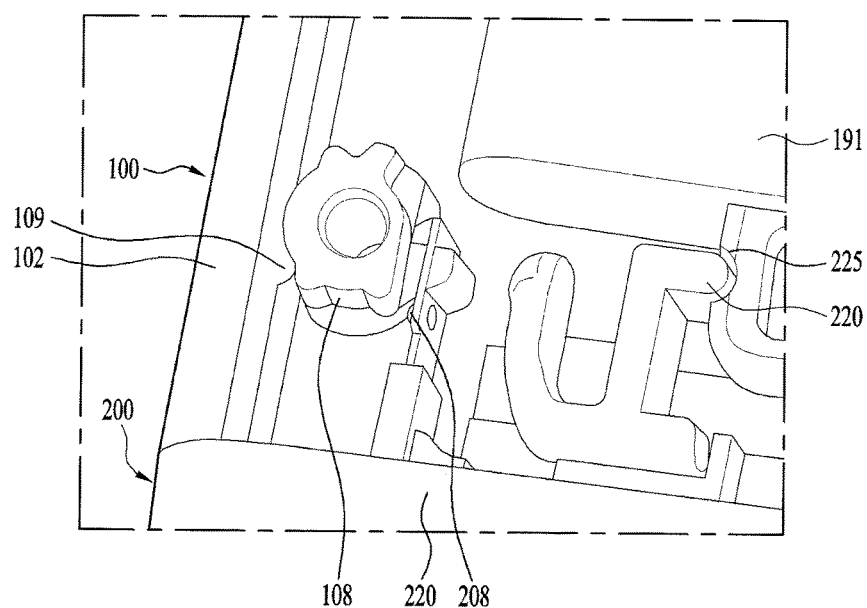
FIG. 8 is a perspective diagram illustrating another example of the moving hook and another example of the securing hook which are provided in the mobile terminal.
Figure 9:
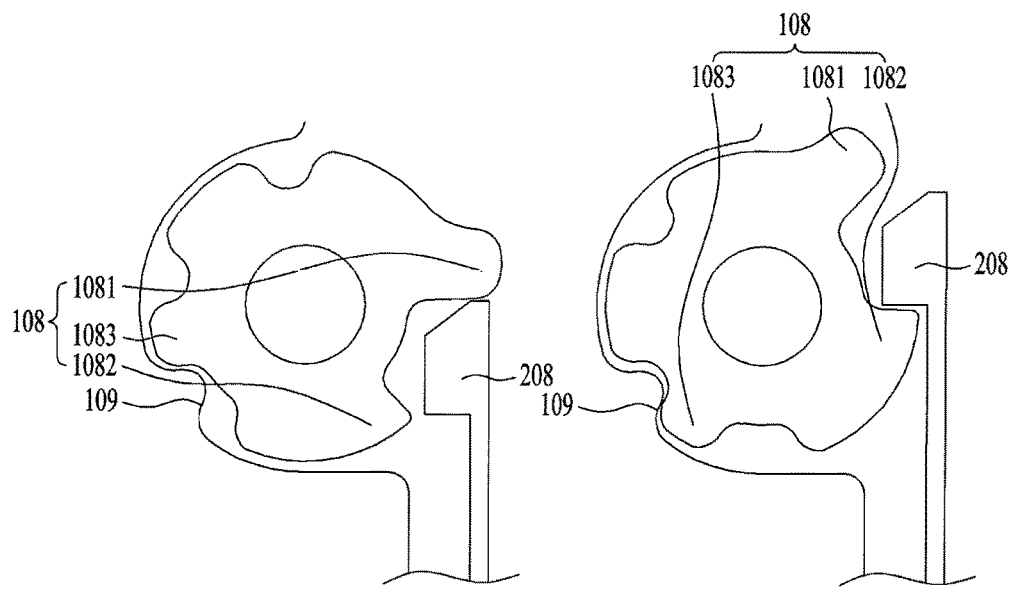
FIG. 9 is a sectional diagram to describe an operation of FIG. 8.

Next, FIG. 8 is a perspective diagram illustrating other examples of the moving hook 108 and the fixing hook 208 provided in the mobile terminal 10. FIG. 9 is a sectional diagram to describe an operation of the examples shown in FIG. 8. Referring to FIG. 9, the illustrated example of the moving hook 108 may be a cam member 108 having a plurality of protrusions 1081, 1082 and 1083. The cam member 108 is rotatably coupled to the first body 100 and protrusions are formed in an outer circumferential surface. Each of the protrusions has a different distance from the shaft to each outer surface.

The plurality of the protrusions may consist of first and second protrusions 1081 and 1082 which are in close contact with the fixing hook 208 and a third protrusion 1083 which is in close contact with a hooking protrusion projected from the first body 100.

The fixing hook 208 is provided in the second body 200 to pull and rotate the protrusions projected from the cam member 108. When the second body 200 is coupled to the first body 100, the fixing hook 208 pulls the first protrusion 1081 of the cam member 108 and rotates the cam member 108 in a first direction (in a counter-clockwise direction in the drawing)(see FIG. 9(a)). When the second body 200 is decoupled from the first body 100, the fixing hook 208 pulls the second protrusion 1082 and rotates the cam member 108 in a second direction (in a clockwise direction in the drawing)(see FIG. 9(b)). In other words, a distance between the first protrusion 1081 and the second protrusion 1082 is as far as the size of the fixing hook 208.

The third protrusion 1083 may be further provided to restrict the rotation of the cam member 108, such that the cam member 108 can be rotated by the restriction of the third protrusion 1083 only when a predetermined force or more is applied thereto. The third protrusion 1083 engages with the hooking protrusion 109 projected from the first body 100 and the positions of the hooking protrusion 109 and the third protrusion 1083 are changed according to the rotation of the cam member 108. As shown in FIG. 9(a), the third protrusion 1083 is located in an area near the hooking protrusion before the second body 200 is coupled to the first body 100 and in the other area after the second body 200 is coupled to the first body 100.

In other words, the positions of the hooking protrusion and the third protrusion 1083 are changed according to the coupling state of the first body and the second body 100 and 200. Curved surfaces are provided in one side and the other side of the hooking protrusion 109 and the third protrusion 1083, respectively. When a predetermined force or more is applied to the cam member 108, the third protrusion 1083 passes over the hooking protrusion 109 and the positions of the third protrusion 1083 and the hooking protrusion 109 are changed.

A slope of the inclined surface provided in the third protrusion 1083 may be different from a slope of the inclined surface provided in the hooking protrusion 109. For example, the surfaces in close contact with each other when the first and second bodies 100 and 200 are coupled to each other may be gently inclined. The other surfaces in close contact when the bodies 100 and 200 are decoupled from each other may be steeply inclined. In this instance, the coupling between the first body 100 and the second body 200 is performed even by a small force and the decoupling between them is performed by a relatively large force.

The fixing hook 106 is located in the second body 200 and the hooking protrusion 109 is located in the first body 100. Accordingly, the third protrusion 1083 may be located in the reverse direction with the first protrusion 1081 and the second protrusion 1082.

Figure 10:
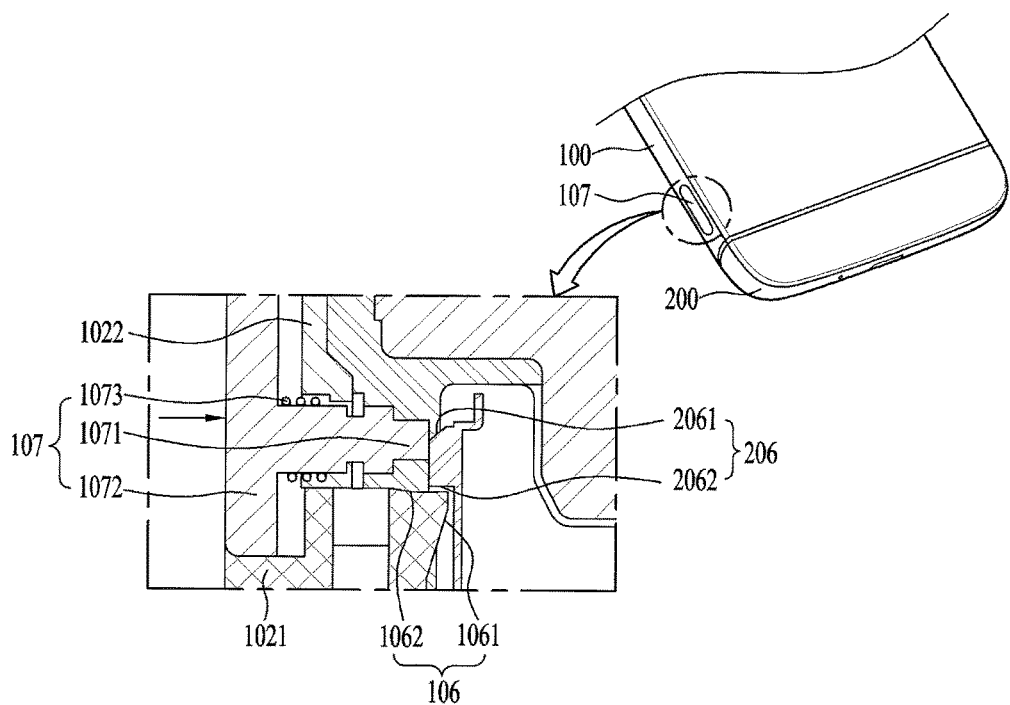
FIG. 10 is a diagram illustrating one example of a button unit provided in the mobile terminal.

FIG. 10 is a diagram illustrating one example of the button unit provided in the mobile terminal. In the drawing, the hook disposed in the first body 100 is the fixing hook 106 and the hook disposed in the second body 200 is the moving hook 206. As an alternative example, the moving hook may be disposed in the first body 100 and the fixing hook in the second body.

The moving hook 206 uses a deformable material such as a plate spring. The fixing hook 106 is extended from the case 102.

The fixing hook 106 and the moving hook 206 include inclined surfaces 1061 and 2061 and steps 1062 and 2062, respectively. The inclined surfaces 1061 and 2061 are formed in the surfaces in close contact when the first and second bodies 100 and 200 are coupled to each other, respectively. The fixing hook 106 has the inclined surface 1061 in a direction to the open side of the first body 100 and the moving hook 206 has the inclined surface 2061 in the other direction where the second body 200 is coupled to the first body 100. When the second body 200 is coupled to the first body 100, the inclined surfaces 1061 and 2061 closely contact with each other. As the second body 200 is getting closer to the first body 100, the moving hook 206 is moving more backward (rightward in the drawing).

In contrast, the steps 1062 and 2062 are formed in the other direction of the fixing hook 106 and in one direction of the moving hook 206, respectively. When the fixing hook 106 and the moving hook 206 moving along the inclined surfaces 1061 and 2061 are stopped by the steps 1062 and 2062, the second body 200 is fixedly coupled to the first body 100.

A releasing button 107 may be further provided to transmit the force to the moving hook 206 to release the steps 1062 and 2062 so as to decouple the second body 200. The releasing button 107 consists of a pressing portion 1072 exposed outside the first body 100 and a pushing portion 1071 inwardly extended from the pressing portion 1072 to apply a force to the moving hook 206. When the user pushes the pressing portion 1072, the pushing portion 1071 pushes the moving hook 206 to decouple the second 200 from the first body 100.

The releasing button 107 may further include a flexible portion 1073 provided between the case of the first body 100 and the pressing portion 1072 to return to the original position after pressed by the user.

Figure 11:
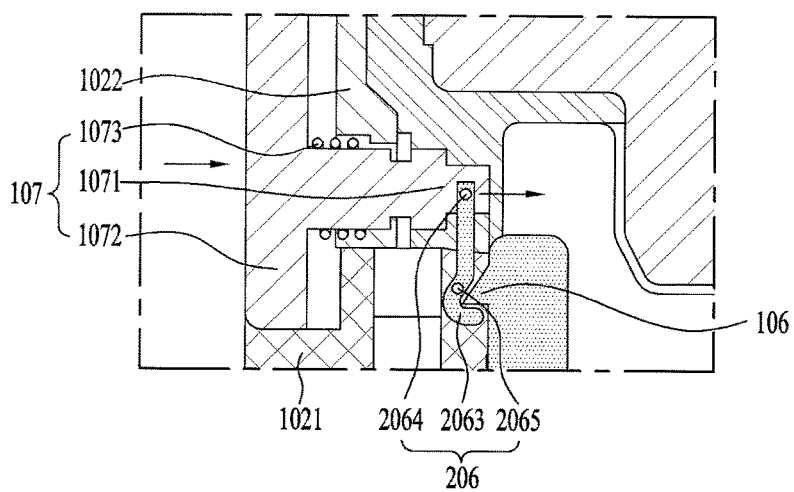
FIG. 11 is a diagram illustrating another example of the button unit provided in the mobile terminal.

FIG. 11 is a diagram illustrating another example of the button unit provided in the mobile terminal. Referring to FIG. 11, the moving hook 206 is provided in the first body 100 and the fixing hook 106 is provided in the second body 200.

The fixing hook 106 is provided in the second body 100 and a step 2062 is formed in the second body 200 to have the moving hook 206 secured thereto, like the moving hook 206 of the example mentioned above. A hook portion 2063 is formed is formed in one side of the moving hook 206 and the hook portion 2063 is secured to the fixing hook 106. The other side of the moving hook 206 is hingedly secured to the releasing button 107.

A middle portion between the side and the other side of the moving hook 206 is hingedly secured to the first body. When the user presses the releasing button 107, the other side of the moving hook 206 is moving and one side of the moving hook 206 is moving in the reverse direction. The hook portion 2063 is released from the fixing hook 106. When the releasing button 107 is located in the second body 200, the positions of the moving hook 206 and the fixing hook 106 are changeable.

Figure 12:
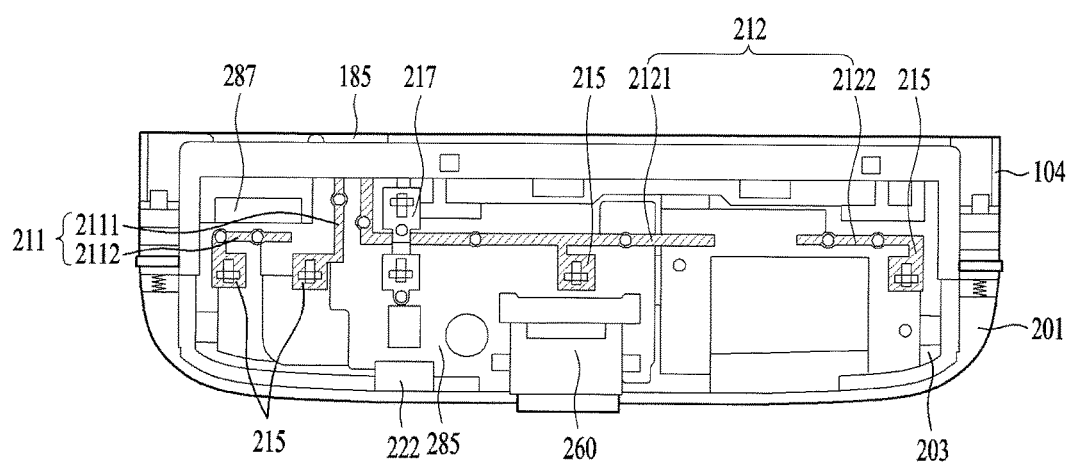
FIG. 12 is a diagram illustrating arrangement of internal components of the second body provided in the mobile terminal.
Figure 13:
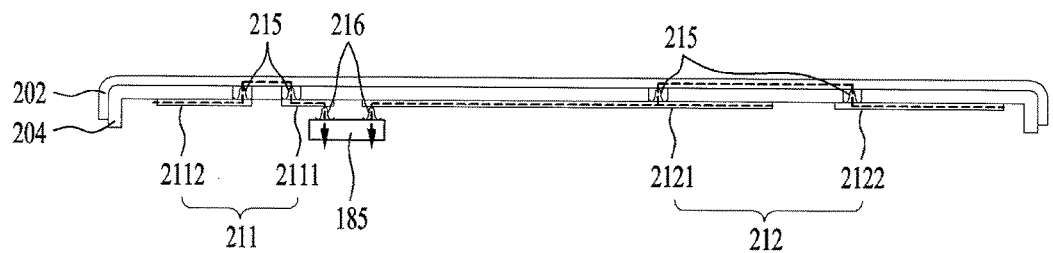
FIG. 13 is a sectional diagram along A-A of FIG. 1b.

FIG. 12 is a diagram illustrating arrangement of components inside the second body 200. FIG. 13 is a sectional diagram along A-A of FIG. 1b. An antenna may be mounted in the second body 200. The wireless communication unit transmits and receives a signal, using the antenna, and signals having a different frequency according to the length and pattern of the antenna.

As mentioned above, the metal case has the disadvantage of the noise generated in the wireless signal of the antenna or the disadvantage of the signal sensibility deterioration. The antenna patterns 2111, 2112, 2121 and 2122 may be arranged in the inner frame 204 made of synthetic resin, spaced apart from the second case 202 made of metal.

The antenna patterns 2111, 2112, 2121 and 2122 are formed in an internal surface of the inner frame 204 to be electrically disconnected from the metal portion 202. FIG. 14 shows a state where the second case 202 of the second body 200 is removed, leaving only the antenna patterns 2111, 2112, 2121 and 2122. The antenna patterns 2111, 2112, 2121 and 2122 may be integrally formed in the inner frame 204 by double-injection molding.

The antenna patterns 2111, 2112, 2121 and 2122 are provided with a wireless signal by the main board 185 and emit the wireless signals. Referring to FIG. 14, one end of the antenna pattern is connected to the main board 185. The antenna pattern 2111, 2112, 2121 and 2122 are extended in opposite directions with respect to the area connected to the main board 185, respectively, and divided into a first antenna unit 211 and a second antenna unit 212.

Techniques of wireless communication become diversified and one of them requires wireless mobile broadband which uses signals in diverse frequency bands. The antenna patterns may be divided into the first antenna unit 211 and the second antenna unit 212 which can transmit and receive different signals.

The first antenna unit 211 is arranged in a right portion with respect to the area connected to the main board 185. The second antenna unit 212 may be arranged in a left portion with respect to the connected area to the main board 185. Each of the first and second antenna units 211 and 212 has a plurality of patterns. The first antenna unit 211 of the illustrated example includes a first pattern and a second pattern. The first pattern 2111 and the second pattern 2112 are connected 215 to the metal second case 202 of the second body 200 and electrically connected with each other.

The second antenna unit 212 may include a third pattern 2121 and a fourth pattern 2122. The third pattern 2121 and the fourth pattern 2122 are connected 215 to the metal second case 202 of the second body 200 and electrically connected with each other.

Referring to FIG. 13, a direction in which electric currents flow may be identified. Electric currents flow to the main board 185 via the second pattern 2112, the second case 202 and the first pattern 211 in the first antenna unit 211. Electric currents flow to the main board 185 via the fourth pattern 2122, the second case 202 and the third pattern 2121 in the second antenna unit 212.

In the illustrated example, the antenna patterns 2111, 2112, 2121 and 2122 arranged in the second body 200 are separated from the second case made of metal via the main board 185 and the connection pin 215, with the inner frame 204 there between. The connection pins 215 and 216 may be plate-spring connection clips with elasticity.

As described above, the mobile terminal in accordance with the present disclosure may use the case having the continuous surface from the lateral surface to the rear surface, with no battery cover. Accordingly, the exterior design of the mobile terminal may be improved.

If using the metal case, the non-conductive material has to be partially used for the arrangement of the antenna. However, the body of the mobile terminal is divided into the two bodies and the battery is replaceable. Accordingly, the battery use time may be solved.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
   a display unit;
   a first body comprising a front surface in which the display unit is disposed and one open side;
   a battery receiving unit provided in the first body;
   a second body coupled to the open side of the first body;
   a battery coupled to the second body and provided in the battery receiving unit;
   a fixing hook provided in one of the first body and the second body;
   a moving hook provided in the other one of the first body and the second body and having a shape corresponding to a shape of the fixing hook; and
   a releasing button configured to release the moving hook from the fixing hook by applying a predetermined force to the moving hook,
   wherein the fixing hook comprises a step and an inclined surface provided in a first direction facing the open side of the first body, and
   wherein the moving hook comprises a step and an inclined surface facing a direction opposite the first direction.

2. The mobile terminal of claim 1, wherein the releasing button is provided in one or more of right and left portions of the mobile terminal.

3. The mobile terminal of claim 1, wherein the releasing button comprises:
   a pressing portion exposed to one or more of right and left sides of the first body;
   a pushing portion inwardly extended from the pressing portion to transmit the force applied to the pressing portion to the moving hook; and
   a spring disposed between the pressing portion and the pushing portion.

4. The mobile terminal of claim 1, wherein the moving hook is provided in the second body and is comprised of spring steel, and
   wherein the releasing button is configured to transmit a force and to elastically deform the moving hook to release the moving hook from the fixing hook.

5. The mobile terminal of claim 3, wherein the fixing hook is provided in the second body, and
   wherein the moving hook comprises:
   a first hinge provided in a first end and coupled to the pressing portion;
   a hook portion provided in an end opposite to the first end and coupled to the fixing hook; and
   a second hinge provided adjacent to the hook portion and coupled to the first body.

6. The mobile terminal of claim 5, wherein the second hinge is provided in a middle area of the hook portion.

7. The mobile terminal of claim 1, further comprising:
   a battery fixing groove provided in the battery and having a hemispherical shape; and a battery fixing projection coupled to the second body and having a curved surface provided at one end thereof, the curved surface corresponding to a shape of the battery fixing groove and configured to be inserted in the battery fixing groove.

8. The mobile terminal of claim 1, wherein the first body comprises a first metal portion and a resin portion provided at one end of the first metal portion, and
wherein the second body comprises a second metal portion provided on an outer surface.

9. The mobile terminal of claim 8, wherein the resin portion is parallel to an end of the display unit.

10. The mobile terminal of claim 8, further comprising:
a main board mounted in the first body;
an inner frame mounted in the second body and comprising an antenna pattern; and
a connection pin configured to electrically connecting the main board and the antenna pattern to each other,
wherein the main board controls signals to be transmitted and received via the antenna pattern.

11. The mobile terminal of claim 10, wherein the antenna pattern comprises a connection pin connected to the second metal portion.

12. The mobile terminal of claim 10, wherein the antenna pattern comprises:
a first antenna unit attached to a first end portion of the connection pin; and
a second antenna unit attached to a second end portion of the connection pin,
wherein the first end portion of the connection pin is different from the second end portion of the connection pin.

13. The mobile terminal of claim 8, wherein the resin portion comprises a magnetic material.

14. The mobile terminal of claim 1, further comprising:
a main board mounted in the first body;
a sub board mounted in the second body and connected with electronic components mounted in the second body; and
a connector disposed in the sub board and connected to the main board.

15. A mobile terminal comprising:
a display unit;
a first body comprising a front surface in which the display unit is disposed and one open side;
a battery receiving unit provided in the first body;
a second body coupled to the open side of the first body;
a battery coupled to the second body and provided in the battery receiving unit;
a first metal portion provided on the rear surface and the side surface of the first body;
a second metal portion provided on an outer surface of the second body;
a resin portion provided between the first metal portion and the second metal portion;
a fixing hook provided in one of the first body and the second body; and
a moving hook provided in an other one of the first body and the second body and having a shape corresponding to a shape of the fixing hook.

16. The mobile terminal of claim 15, wherein the fixing hook comprises a projection, and wherein the moving hook comprises an S-shaped curved surface having a protrusion and a groove, wherein the groove has a hemispherical shape and the projection of the fixing hook has a shape corresponding to the shape of the groove,
wherein the fixing hook is configured to contact the groove of the moving hook in a state where the second body is coupled to the first body, and
wherein the fixing hook is configured to contact the protrusion of the moving hook such that the moving hook is elastically deformed.

17. The mobile terminal of claim 15, wherein the first body has a hooking protrusion,
wherein the fixing hook comprises a projection,
wherein the moving hook comprises at least one protrusion,
wherein the at least one protrusion of the moving hook is configured to engage with the hooking protrusion of the first body, and
wherein another of the at least one protrusion of the moving hook is configured to engage with the projection of the fixing hook.

18. The mobile terminal of claim 15, wherein one or more of the moving hook and the fixing hook comprises Polyoxymethylene (POM).

19. The mobile terminal of claim 15, wherein the moving hook comprises:
a cam member rotatably coupled to a shaft of the first body, the cam member comprising:
a first protrusion provided on an outer circumferential surface of the cam member and configured to contact the fixing hook and to rotate the cam member when the second body is moved to the first body;
a second protrusion provided on the outer circumferential surface of the cam member and configured to maintain a coupling state between the first body and the second body by contacting the fixing hook when the second body is coupled to the first body; and
a third protrusion provided on the outer circumferential surface of the cam member and comprising a curved surface,
the mobile terminal further comprising a hooking protrusion provided in the first body,
wherein the third protrusion is configured to contact the hooking protrusion,
wherein the third protrusion is configured to abut a first side of the hooking protrusion in a state where the second body is decoupled from the first body and is configured to abut a second side of the hooking protrusion in a state where the second body is coupled to the first body, where the first side of the hooking protrusion is different from a second side of the hooking protrusion, and
wherein a distance between the first protrusion and the second protrusion corresponds to a size of the hooking protrusion.

20. The mobile terminal of claim 15, wherein the second body comprises:
a first portion inserted in the first body;
a second portion; and
a rubber member projected past an outer surface of the second portion.

* * * * *